(12) United States Patent
Sugiura et al.

(10) Patent No.: US 6,386,923 B2
(45) Date of Patent: May 14, 2002

(54) ASSEMBLING STRUCTURE OF ELECTRONIC UNIT TO ELECTRICAL CONNECTING BOX

(75) Inventors: Tomohiro Sugiura; Kumiko Sato, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/734,582

(22) Filed: Dec. 13, 2000

(30) Foreign Application Priority Data

Dec. 17, 1999 (JP) .......................................... 11-359751

(51) Int. Cl.⁷ .............................................. H01R 13/64
(52) U.S. Cl. ....................................... 439/680; 439/948
(58) Field of Search ................................ 439/680, 681, 439/948, 162, 164, 165

(56) References Cited

U.S. PATENT DOCUMENTS 4,952,176 A * 8/1990 Koiner et al. ................ 439/681
5,370,556 A * 12/1994 Olsson ........................ 439/681

FOREIGN PATENT DOCUMENTS

| EP | 0 550 057 B1 | 4/1997 |
|---|---|---|
| JP | 61-20104 | 10/1985 |
| JP | 5-2527 | 1/1993 |
| JP | 10-80041 | 3/1998 |

* cited by examiner

Primary Examiner—Tulsidas Patel
Assistant Examiner—Phuong KT Dinh
(74) Attorney, Agent, or Firm—Finnegan, Henderson, Farabow, Garrett & Dunner, L.L.P.

(57) ABSTRACT

An assembling structure of an electronic unit to an electrical connecting box is provided. This assembling structure is provided with a miss-connection preventing portion on at least one of an electrical connecting box and an electronic unit combined to each other. The miss-connecting preventing portion is put in an interfering state with the mating side member to prevent the combination thereof when the two are combined improperly. The miss-connection prevention portion is provided at a peripheral wall portion of the electronic unit so that it interferes with a peripheral wall portion of the electrical connecting box when combination of the electrical connecting box and the electronic unit is improper.

3 Claims, 5 Drawing Sheets

FIG.2A
FIG.2B
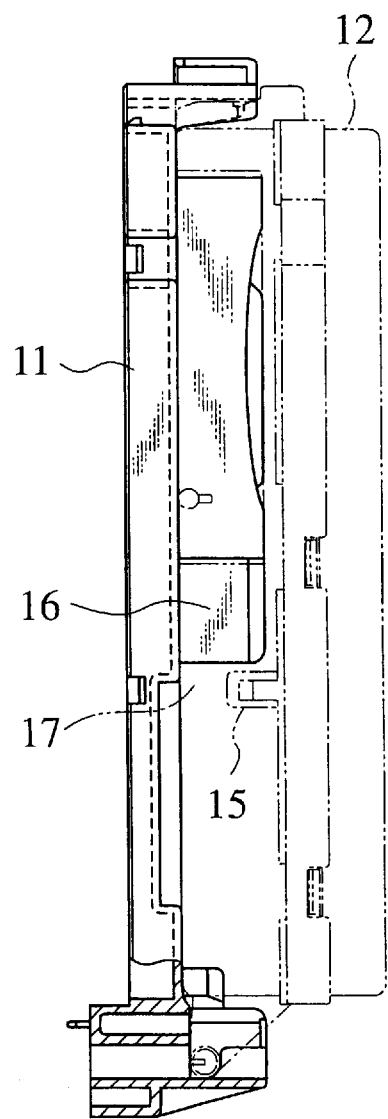
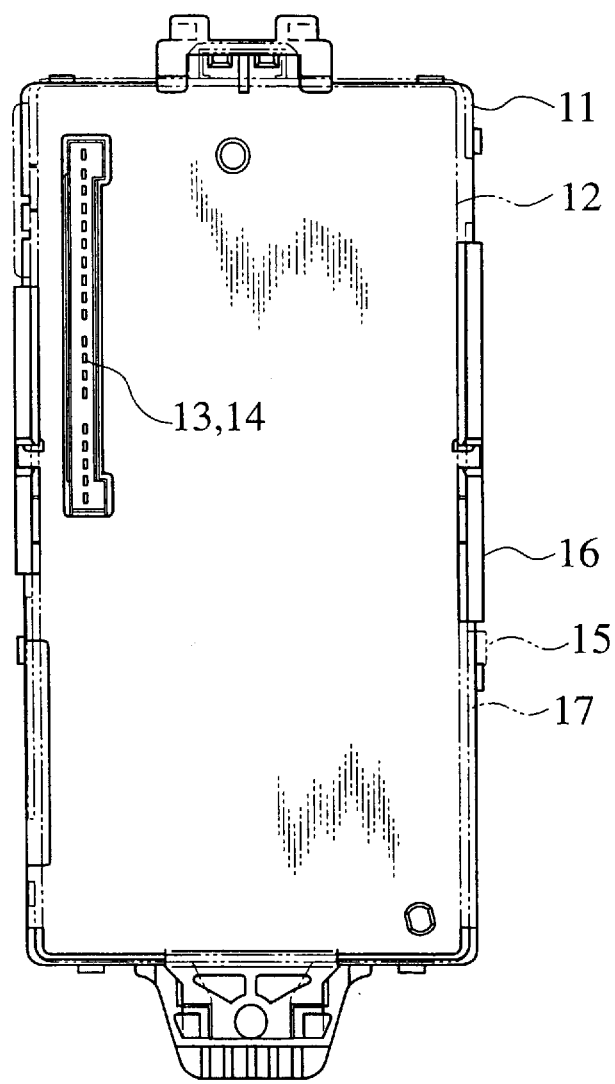

FIG.3A
FIG.3B
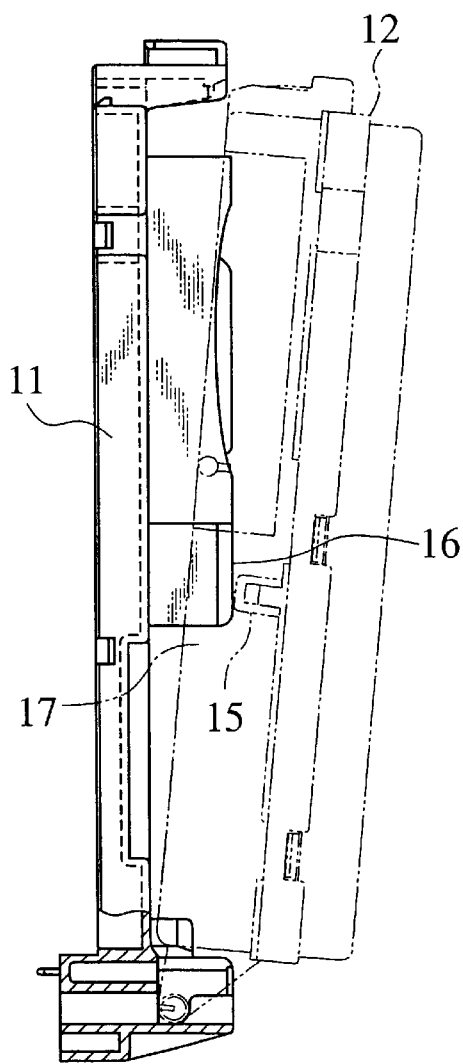
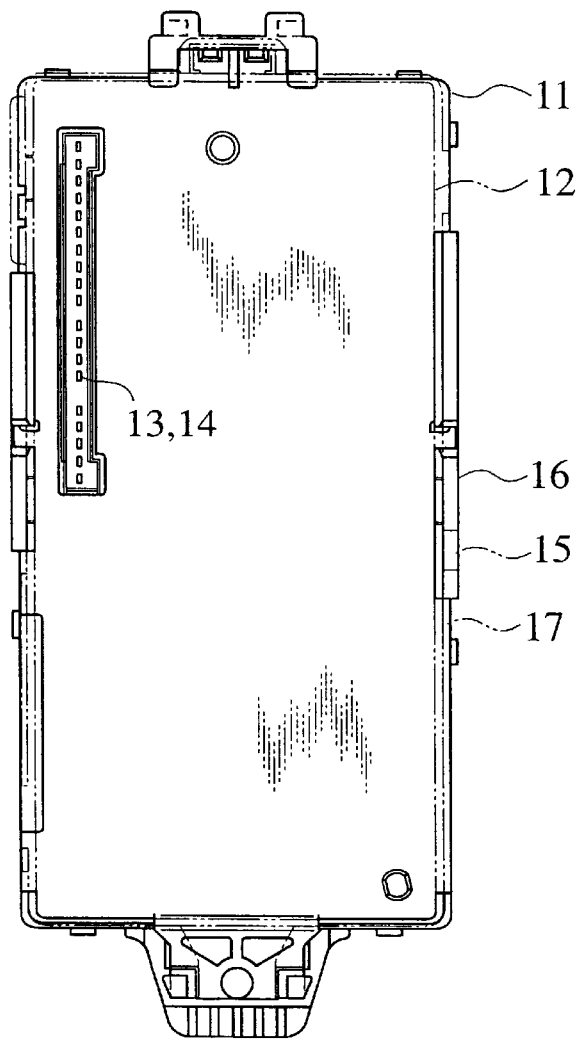

FIG.4A
FIG.4B
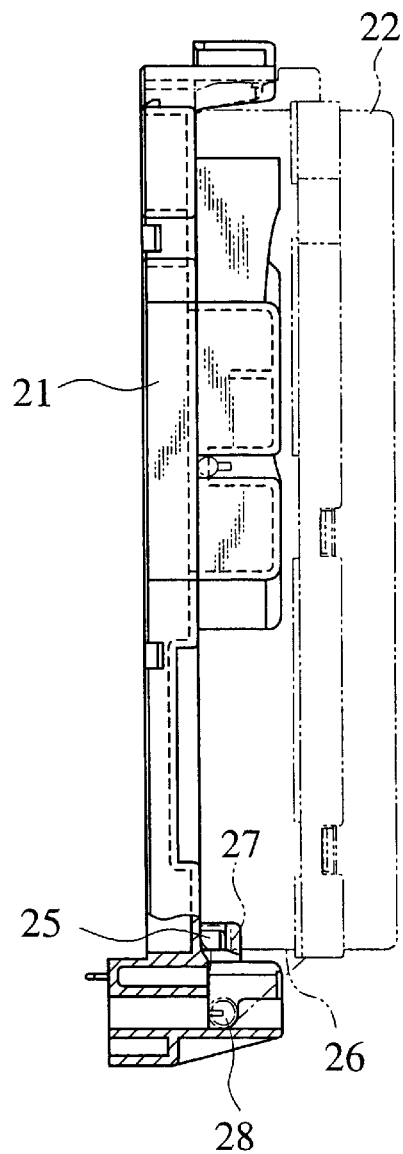
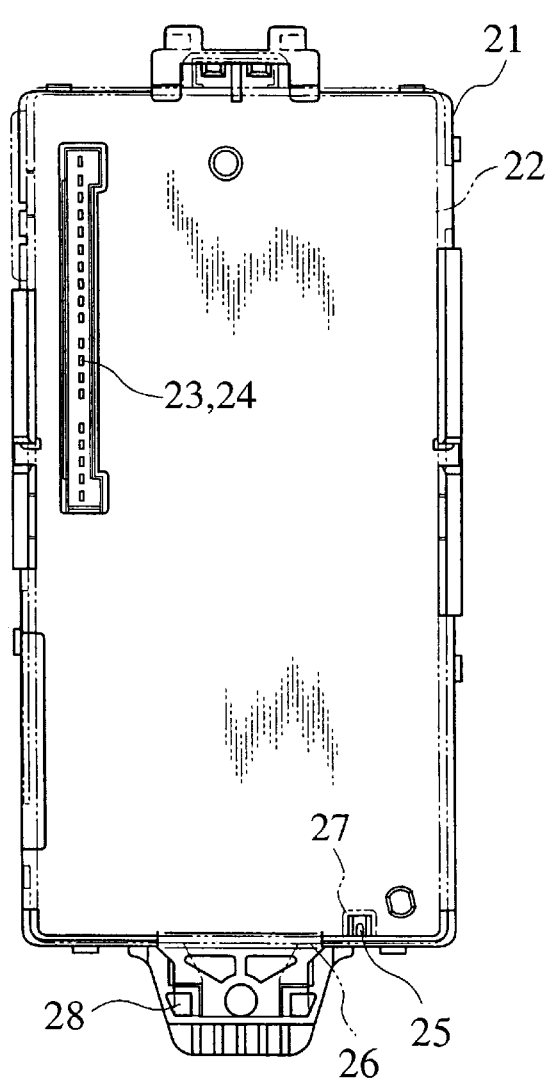

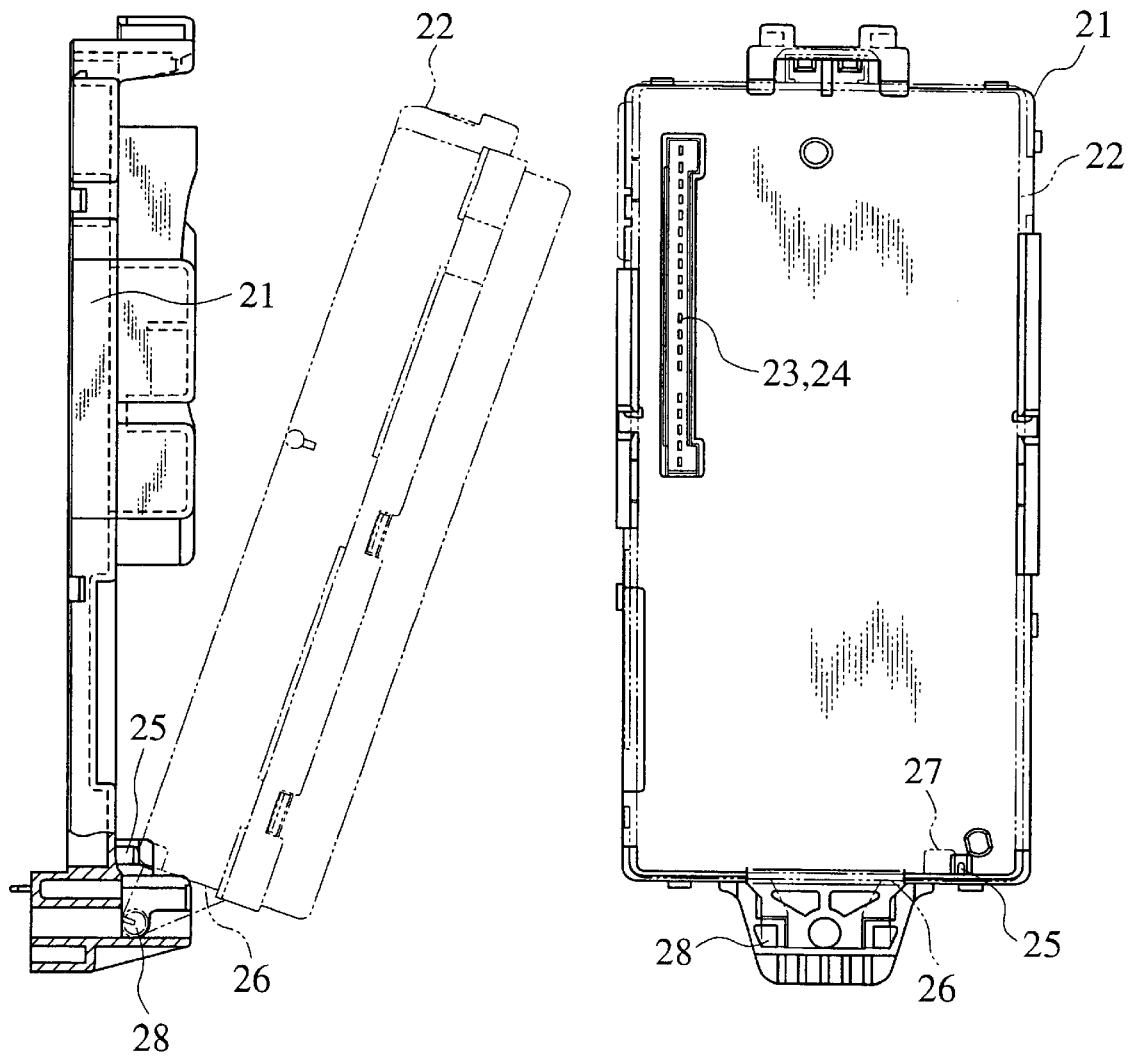

ASSEMBLING STRUCTURE OF ELECTRONIC UNIT TO ELECTRICAL CONNECTING BOX

BACKGROUND OF THE INVENTION

There is a tendency that electronic components mounted on a vehicle is diversified according to increase in application of electronics to an automobile, and wires/cables forming wired circuits for the electronic components, and wire harnesses for bundling the wires/cables are also increased. In recent years, in order to prevent complexity due to increase in kinds of harness, such a structure is often employed that an electronic unit is mechanically connected to an electrical connecting box in which harnesses are taken as much as possible and male terminals and female terminals in both the unit and the box are connected electrically to each other.

FIGS. 1A and 1B are views showing a conventional example of a structure where an electrical connecting box and an electronic unit are coupled to each other, FIG. 1A being a side view and FIG. 1B being a plan view. Incidentally, in FIGS. 1A and 1B, an electronic unit is illustrated with a double dotted line for a convenience. In FIGS. 1A and 1B, reference numeral 1 denotes an electrical connecting box, reference numeral 2 denotes the electronic unit. The electrical connecting box 1 and the electronic unit 2 are connected mechanically to each other, and a male connector portion 3 and a female connectors portion 4 in both the box 1 and the unit 2 are electrically connected to each other by connecting the both mechanically.

In such an assembling structure of the electrical connecting box 1 and the electronic unit 2, there often occurs assembling modification according to specifications. Therefore, such a structure has been employed conventionally, as illustrated, that a miss-connection preventing boss 5 is provided in a projecting manner at a face-to-face portion of a central portion on the electrical connecting box 1 and a recessed portion 6 in which the miss-connection preventing boss 5 is fitted is provided at the electronic unit 2. Therefore, by changing the position of the miss-connection preventing boss 5 according to a specification required, the miss-connection preventing boss 5 is fitted in the recessed portion 6 only at a time of proper combination of an electrical connecting box and an electronic unit, while the miss-connection preventing boss 5 interferes with a portion of a mating member other than the recessed portion 6 at a time of improper combination thereof.

In this manner, when the proper combination is employed, an electronic unit can finally be coupled to the electrical connecting box 1, but when the improper combination is employed, coupling of the electrical connecting box and the electronic unit is made impossible in the course of assembling work so that erroneous connection is prevented from occurring.

In the above-mentioned conventional assembling structure, however, since the recessed portion 6 is formed in a part arrangement region on the side of the electronic unit 2 so as to mate with the miss-connection preventing boss 5, there is a spatial limitation when electronic parts are mounted to the electronic unit 2. Therefore, there is a drawback that when, a tall electronic part such as a relay or the like has been mounted on the substrate of the electronic unit 2, a protection case (not shown) of the electronic unit 2 interferes with the electronic part due to contact or the like.

SUMMARY OF THE INVENTION

In view of the above circumstances, an object of the present invention is to provide an assembling structure of an electronic unit to an electrical connecting box where, when an electrical part or component is mounted to an electronic unit, there occurs no spatial limitation and which is provided with a miss-connection preventing function.

According to a first aspect of the present invention, there is provided an assembling structure of an electronic unit to an electrical connecting box, comprising a miss-connection preventing portion provided on at least one of an electrical connecting box and an electronic unit combined to each other, the miss-connection preventing portion being put in a non-interfering state with a mating side member to allow combination of both the electronic unit and the electrical connecting box when the electrical connecting box and the electronic unit are combined properly, and the miss-connection preventing portion being put in an interfering state with the mating side member to prevent the combination thereof when the both are combined improperly, wherein the miss-connection preventing portion is arranged at a peripheral wall portion of at least one of the electrical connecting box and the electronic unit or a portion near thereto, and when the electrical connecting box and the electronic unit are combined improperly, the miss-connection preventing portion interferes with the peripheral wall portion of the mating side member or the portion near thereto.

In the assembling structure of the first aspect, the miss-connection preventing portion is provided at the peripheral wall portion of the at least one of the electrical connecting box and the electronic unit or the portion near thereto, and a portion interfering with the miss-connection preventing portion is provided at a peripheral wall portion of the mating side member or a portion near to the peripheral wall portion. Accordingly, a central region for layout of electrical parts is not subjected to limitation and erroneous connection can be prevented without using any additional testing tool such as a jig.

According to a second aspect of the present invention, there is an assembling structure of an electronic unit to an electrical connecting box according to the first aspect, wherein the electrical connecting box and the electronic unit are connected through a hinge and the miss-connection preventing portion is disposed near the hinge.

In the assembling structure of this aspect, the miss-connection preventing portion interfering with the mating side member at a time of improper combination is provided near the hinge. Accordingly, when the electronic unit is combined to the electrical connecting box while being rotated relative thereto, connection of a connector of the electrical connecting box and that of the electronic unit can be stopped before start of the connection. For this reason, at a stage before real connection of these connectors is started with force, miss-combination can be found and wasteful work can be avoided.

BRIEF DESCRIPTION OF THE DRAWINGS

FIGS. 2A and 2B are side and plan views for explaining a state where an electrical connecting box and an electronic unit have been connected to each other with a proper combination thereof in a first embodiment of the present invention;

FIGS. 3A and 3B are side and plan views for explaining a state before an electrical connecting box and an electronic unit is connected to each other with an improper combination thereof in the first embodiment of the present invention;

FIGS. 4A and 4B are side and plan views for explaining a state where an electrical connecting box and an electronic unit have been connected to each other with a proper combination thereof in a second embodiment of the present invention; and FIGS. 5A and 5B are side and plan views for explaining a state before an electrical connecting box and an electronic unit is connected to each other with an improper combination thereof in the second embodiment of the present invention.

DESCRIPTION OF THE PREFERRED EMBODIMENTS

Figure 1A:
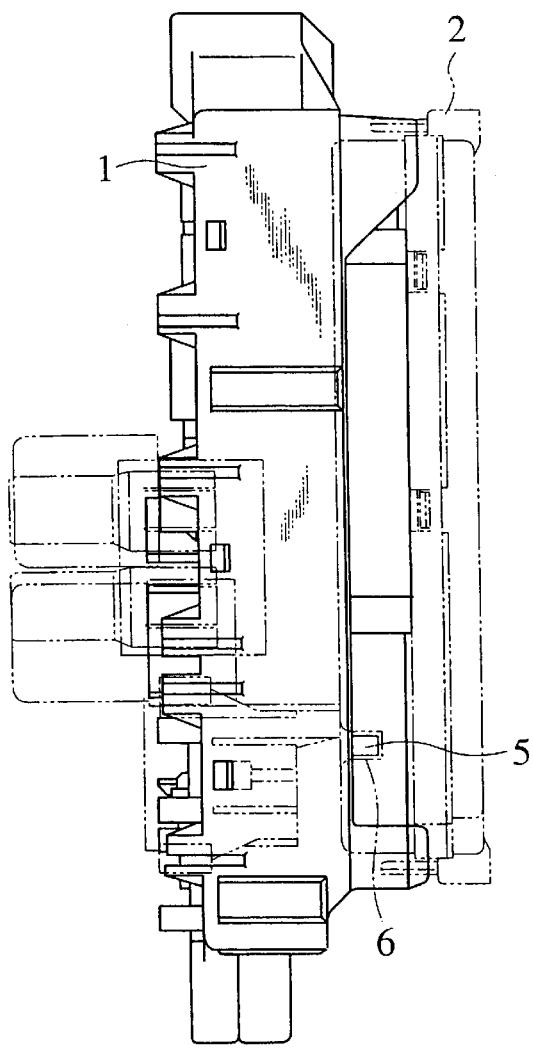
FIGS. 1A and 1B are side and plan views for explaining a conventional assembling structure of an electrical connecting box and an electronic unit in accordance with the prior art.
Figure 1B:
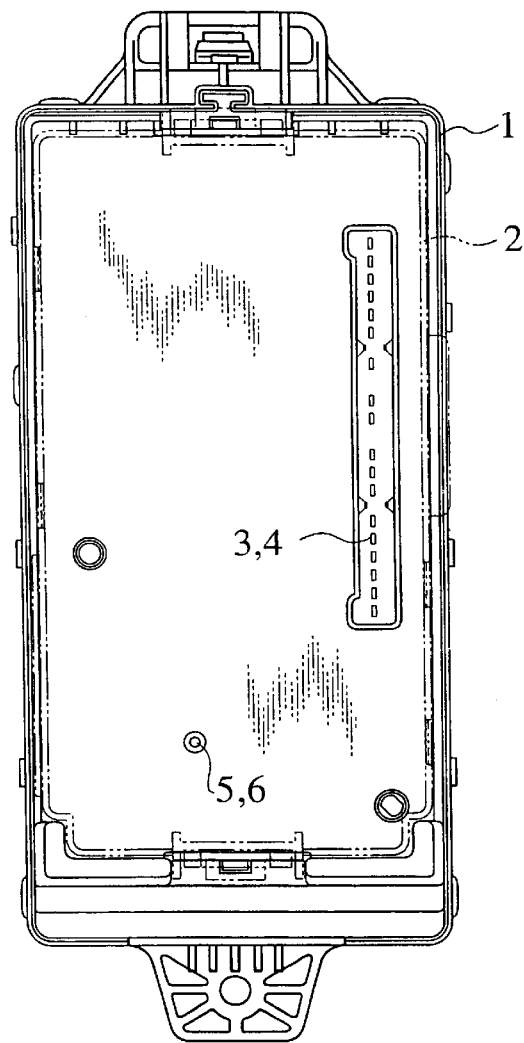

Embodiments of the present invention will be explained below with reference to the drawings.

FIGS. 2A and 2B are explanatory views showing a state where an electrical connecting box 11 and an electronic unit 12 have been connected to each other with a proper combination thereof in an assembling structure of a first embodiment of the present invention, and FIGS. 3A and 3B are explanatory views showing a state just before the electrical connecting box 11 and the electronic unit 12 are connected to each other with an improper combination thereof in the assembling structure. In the respective figures, "A" denotes a side view and "B" denotes a plan view.

The electrical connecting box 11 and the electronic unit 12 are respectively provided with connectors 13, 14 connected electrically to each other when the both are connected to each other properly.

The electrical connecting box 11 is formed in a rectangular shape, and it is provided at outer peripheral portions corresponding to a long side with a protection wall (peripheral wall) 16. The protection wall 16 is partially provided without the entire wall, so that a portion 17 where the protection wall is not formed is provided adjacent to the protection wall 16.

Meanwhile, a miss-connection preventing rib (miss-connection preventing portion) 15 is provided in a projecting manner at a peripheral wall of the electronic unit 12 fitted inside the protection wall 16. As shown in FIGS. 2A and 2B, only when the electrical connecting box 11 and the electronic unit 12 are connected to each other with their proper combination, the miss-connection preventing rib 15 enters in the portion 17 where the protection wall of the electrical connecting box 11 is not formed and does not interfere with the protection wall 16, thereby allowing a proper connection of the electronic unit 12 to the electrical connecting box 11. Also, as shown in FIGS. 3A and 3B, when the electrical connecting box 11 and the electronic unit 12 are combined improperly, the miss-connection preventing rib 15 interferes with the protection wall 16 of the electrical connecting box 11, thereby preventing the assembling of the electronic unit 12 to the electrical connecting box 11.

The proper combination means combination of an electrical connecting box and an electronic unit having the same specification and that combining position of the electrical connecting box and the electronic unit is proper. Therefore, the proper combination includes a case that the combined electrical connecting box and electronic unit function so as to meet a predetermined specification.

As shown in FIGS. 3A and 3B, proper combining operation can not be performed at a time of an improper combination, so that miss-connection can be prevented and combination of an electrical connecting box and an electronic unit which have different specifications can be identified.

In the assembling structure of this embodiment, the miss-connection preventing rib 15 is provided at the peripheral wall portion of the electronic unit 12 and it interferes with the protection wall 16 positioned at the peripheral portion of the electrical connecting box 11 at a time of the improper combination, so that a central region for layout of electrical parts of the electronic unit 11 is not subjected to spatial limitation at all. That is, there is the miss-connection preventing rib 15 in an outside region (peripheral wall portion) where electrical parts mounted on the substrate of the electronic unit 12 are not crowded, the electronic unit is not subjected to spatial limitation at all and the layout of electrical parts can be designed freely.

Furthermore, as the miss-connection preventing rib 15 is not provided at a central portion of the electronic unit, the miss-connection preventing rib is prevented from interfering with any electrical part in the electronic unit in the course of adjustment of the positions of the electrical connecting box and the electronic unit in both the improper combination and the proper combination.

Incidentally, as a modified embodiment of the present invention, a plurality of miss-connection preventing ribs may be provided, or such a structure may be employed that the miss-connection preventing rib is formed at the outer peripheral portion of the electrical connecting box and a portion which does not include a wall is provided at a position corresponding to the peripheral wall portion of the electronic unit. Also, as another modified embodiment, such a structure may be employed that at least one miss-connection preventing rib is provided on the electrical connection box and at least one miss-connection preventing rib is provided on the electronic unit. In both the modified embodiments, it would be understood that the electronic unit is not subjected to spatial limitation.

Second Embodiment

FIGS. 4A and 4B are explanatory views showing a state where an electrical connecting box 21 and an electronic unit 22 have been connected to each other with a proper combination thereof in an assembling structure of a second embodiment of the present invention, and FIGS. 5A and 5B are explanatory views showing a state just before the electrical connecting box 21 and the electronic unit 22 are connected to each other with an improper combination thereof in the assembling structure. In the respective figures, "A" denotes a side view and "B" denotes a plane view.

The electrical connecting box 21 and the electronic unit 22 are respectively provided with connectors 23, 24 connected electrically to each other when the both are connected to each other properly in the same manner as the first embodiment. Also, the electrical connecting box 21 and the electronic unit 22 which are rectangular are connected rotatably relative to each other by a hinge 28 disposed at ends, in longitudinal directions, of the electrical connecting box 21 and the electronic unit 22. Incidentally, the hinge 28 is positioned outside the peripheral wall portion 26 of the electronic unit 22.

A miss-connection preventing rib (miss-connection preventing portion) 25 is provided in a projecting manner on a bottom face of the electrical connecting box 21 abutting on the peripheral wall portion 26 of the electronic unit 22, which is positioned near to the hinge 28. Also, a recessed portion 27 in which the miss-connection preventing rib 25 is fitted only when the electrical connecting box 21 and the electronic unit 22 are combined properly is provided on a peripheral wall portion 26 of the electronic unit 22 which is positioned near to the hinge 28.

As shown in FIGS. 4A and 4B, when the electrical connecting box 21 and the electronic unit 22 are connected to each other with their proper combination, the miss-connection preventing rib 25 enters in the recessed portion 27 formed on the peripheral wall portion 26 of the electronic unit 22, thereby allowing a proper connection of the electronic unit 22 to the electrical connecting box 21. Also, as shown in FIGS. 5A and 5B, when the electrical connecting box 21 and the electronic unit 22 are combined improperly, the miss-connection preventing rib 25 interferes with the peripheral wall portion 26 of the electrical connecting box 21, thereby preventing the assembling of the electronic unit 22 to the electrical connecting box 21.

Accordingly, as shown in FIGS. 5A and 5B, when an improper combination is employed, a proper combining operation can not be performed, so that miss-connection can be prevented. In this case, since such a structure has been employed that the miss-connection preventing rib 25 is provided in the vicinity of the peripheral wall portion of the electrical connecting box 21 which is positioned near to the hinge 28 and the miss-connection preventing rib 25 interferes with the peripheral wall portion 26 of the electrical unit 22 which is positioned near to the hinge 28, a region of a central portion for layout of electrical parts of the electronic unit 21 is not subjected to spatial limitations at all. That is, since the miss-connection preventing rib 25 or the recessed portion 27 receiving the rib are provided at an outside region (peripheral wall portion) where electrical parts mounted on the substrate of the electronic unit 22 is not crowded, layout of electrical parts can freely be determined without any spatial limitation.

Also, as there is the miss-connection preventing rib 25 in the vicinity of the hinge 28, connecting operation of connectors 23 and 24 of the electrical connecting box 21 and the electronic unit 22 can be stopped in a stage before the connection of the connectors 23 and 24 starts, in a case that the electronic unit 22 is connected to the electrical connecting box 21 while being rotated relative thereto. Accordingly, whether or not there is miss-connection can be confirmed before real connection of the connectors 23 and 24 is started with force, so that safety can be enhanced and work efficiency or workability can be improved by avoiding wasteful work in advance.

Incidentally, determination about the position of the miss-connection preventing rib 15, 25 to be provided or the number of miss-connection preventing ribs, or determination about whether the miss-connection preventing rib 15, 25 should be provided on the electrical connecting box 11, 21 or the electronic unit 12, 22 may be made arbitrarily. As the number of these combinations is increased, easiness in identification and safety in mounting or combining are further improved.

As mentioned above, according to the first aspect of the present invention, since the miss-connection preventing portion is provided at a peripheral wall portion of at least one of the electrical connecting box and the electronic unit or a portion near thereto and a portion interfering with the miss-connection preventing portion is formed at a peripheral wall portion of a mating side member or a portion near thereto, miss-connection can be prevented without limitation on a central region for layout of electrical parts.

Also, according to the second aspect of the present invention, since the miss-connection preventing portion is provided in the vicinity of the hinge, miss-connection can easily be confirmed before the connectors are connected to each other erroneously, so that wasteful work can be avoided in advance.

What is claimed is:

1. An assembling structure of an electronic unit to an electrical connecting box, comprising:

a miss-connection preventing portion provided on at least one of an electrical connecting box and an electronic unit combined to each other, the miss-connection preventing portion being put in a non-interfering state with a mating side member to allow combination of both the electronic unit and the electrical connecting box when the electrical connecting box and the electronic unit are combined properly, and the miss-connection preventing portion being put in an interfering state with the mating side member to prevent the combination thereof when the both are combined improperly;

the electrical connecting box and the electronic unit being connected to each other through a hinge when the connecting box and the electronic unit are combined, and the miss-connection preventing portion being arranged at a peripheral wall portion of at least one of the electrical connecting box and the electronic unit or a portion near thereto, and when the electrical connecting box and the electronic unit are combined improperly, the miss-connection preventing portion interferes with the peripheral wall portion of the mating side member or the portion near thereto;

whereby the miss-connection preventing portion begins to mate or interfere with the mating side member before an electrical connection is made between the electronic unit and the electrical connecting box.

2. An assembling structure of an electronic unit to an electrical connecting box, comprising:

a miss-connection preventing portion provided on at least one of an electrical connecting box and an electronic unit combined to each other, the miss-connection preventing portion being put in a non-interfering state with a mating side member to allow combination of both the electronic unit and the electrical connecting box when the electrical connecting box and the electronic unit are combined properly, and the miss-connection preventing portion being put in an interfering state with the mating side member to prevent the combination thereof when the both are combined improperly and/or when combining positions of the connecting box and the electronic unit are improper;

the electrical connecting box and the electronic unit being connected to each other through a hinge when the connecting box and the electronic unit are combined; and the miss-connection preventing portion is arranged at a peripheral wall portion of at least one of the electrical connecting box and the electronic unit or a portion near thereto, and when the electrical connecting box and the electronic unit are combined improperly and/or when the combining positions thereof are improper, the miss-connection preventing portion interferes with the peripheral wall portion of the mating side member or the portion near thereto;

whereby the miss-connection preventing portion begins to mate or interfere with the mating side member before an electrical connection is made between the electronic unit and the electrical connecting box.

3. An assembling structure of an electronic unit to an electrical connecting box according to claim 1 or 2, wherein the miss-connection preventing portion is provided in the vicinity of the hinge.

* * * * *